United States Patent
Fronius et al.

(10) Patent No.: US 7,871,226 B2
(45) Date of Patent: Jan. 18, 2011

(54) TOOL HEAD FOR MACHINE-TOOLS WITH UNBALANCE DAMPING

(75) Inventors: Juergen Fronius, Stuttgart (DE); Roland Hoerl, Boennigheim (DE)

(73) Assignee: Komet Group GmbH, Besigheim (DE)

( * ) Notice: Subject to any disclaimer, the term of this patent is extended or adjusted under 35 U.S.C. 154(b) by 909 days.

(21) Appl. No.: 11/662,533

(22) PCT Filed: Aug. 17, 2005

(86) PCT No.: PCT/EP2005/008912

§ 371 (c)(1),
(2), (4) Date: Mar. 9, 2007

(87) PCT Pub. No.: WO2006/029682

PCT Pub. Date: Mar. 23, 2006

(65) Prior Publication Data

US 2008/0089754 A1    Apr. 17, 2008

(30) Foreign Application Priority Data

Sep. 14, 2004   (DE) ................. 10 2004 044 860
Dec. 2, 2004    (DE) ................. 10 2004 058 286

(51) Int. Cl.
*B23C 9/00* (2006.01)
*B23B 47/00* (2006.01)

(52) U.S. Cl. ........................ 409/141; 408/143

(58) Field of Classification Search ................ 409/141, 409/232, 234, 204, 206; 408/143, 147, 150, 408/151, 153, 173, 178, 180, 131; 82/1.2, 82/903; 279/132; 74/570.1, 570.2, 571.1, 74/571.11

See application file for complete search history.

(56) References Cited

U.S. PATENT DOCUMENTS 4,899,628 A    2/1990   Seichter et al.

(Continued)

FOREIGN PATENT DOCUMENTS

DE        839 590        7/1949

(Continued)

OTHER PUBLICATIONS

International Preliminary Examination Report dated Aug. 9, 2004 (16 pages).

(Continued)

*Primary Examiner*—Erica E Cadugan
(74) *Attorney, Agent, or Firm*—Flynn, Thiel, Boutell & Tanis, P.C.

(57) ABSTRACT

The invention relates to a tool head for machine-tools comprising a base body (10) rotatable around an axis of rotation (13), a slider (14) which bears a cutting tool and is adjustable with respect to the base body (10) along an axis of displacement (16) oriented radially with respect to the rotation axis (13) with the aid of a drive mechanism and at least one balancing body (20) for damping the unbalance caused by the slider (14). The aim of said invention is to damp the unbalance and to reduce operating forces. For this purpose, at least two balancing body (20) whose center of gravity (28', 28") is offset on the side of the axis of displacement (16) are guidable and/or pivotable with respect to the slider and the base body at points remote from each other.

39 Claims, 7 Drawing Sheets

U.S. PATENT DOCUMENTS

| | | | | | |
|---|---|---|---|---|---|
| 5,154,554 | A | * | 10/1992 | Ariyoshi | 409/141 |
| 5,174,697 | A | * | 12/1992 | Ariyoshi | 408/239 R |
| 5,478,177 | A | * | 12/1995 | Romi | 408/143 |
| 6,134,996 | A | * | 10/2000 | Scheer et al. | 82/1.2 |

FOREIGN PATENT DOCUMENTS

| | | | |
|---|---|---|---|
| DE | 923 888 | | 2/1955 |
| DE | 2158717 A | * | 8/1973 |
| DE | 39 18914 A1 | | 12/1989 |
| DE | 39 18 118 C2 | | 12/1990 |
| DE | 44 34 166 A1 | | 11/1995 |
| DE | 44 45 277 A1 | | 6/1996 |
| DE | 102 44 857 A1 | | 4/2004 |
| EP | 0 488 774 A1 | | 6/1992 |
| EP | 0 907 444 | | 11/1997 |
| GB | 672469 A | * | 5/1952 |
| GB | 2 066 128 A | | 7/1981 |
| GB | 2232101 A | * | 12/1990 |
| JP | 04-226812 A | * | 8/1992 |
| SU | 872046 B | * | 10/1981 |

OTHER PUBLICATIONS

German Patent Office Search Report dated Aug. 16, 2005 (4 pages).
International Search Report dated Nov. 25, 2005 (4 pages).

* cited by examiner

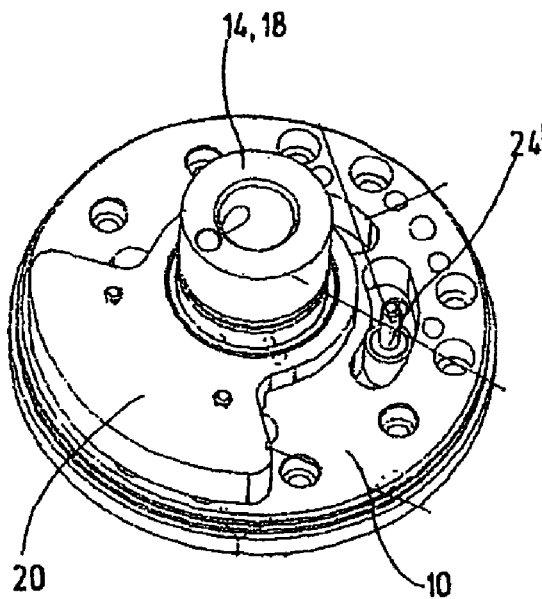
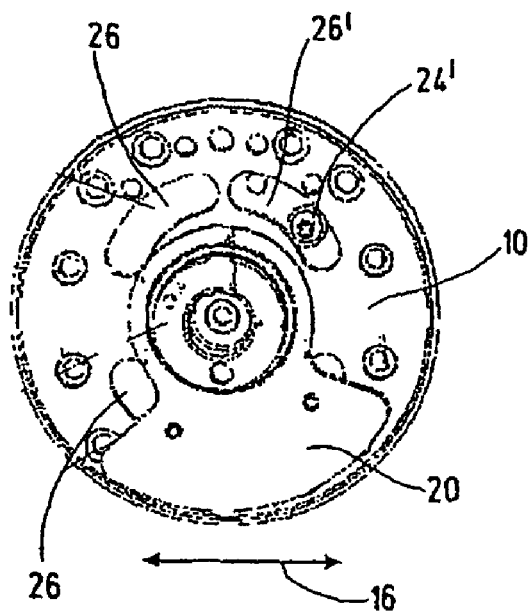
Fig.2a   Fig.2b
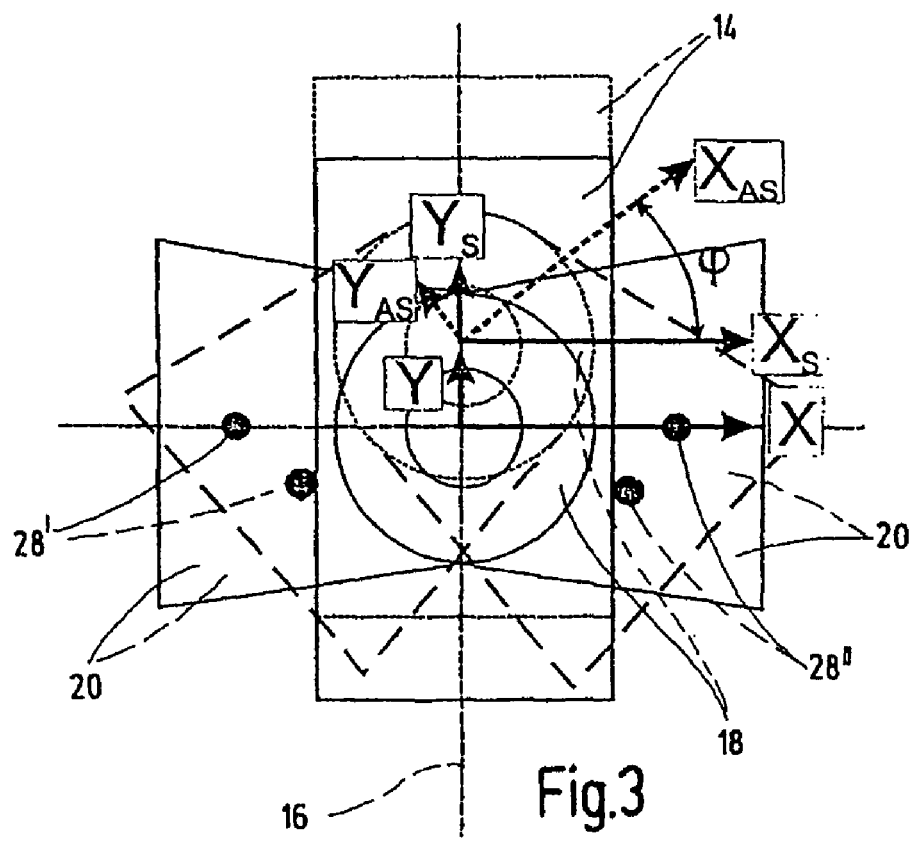
Fig.3

___ Supporting element 24
--- Center of gravity 28'
-·-· Supporting element 24'

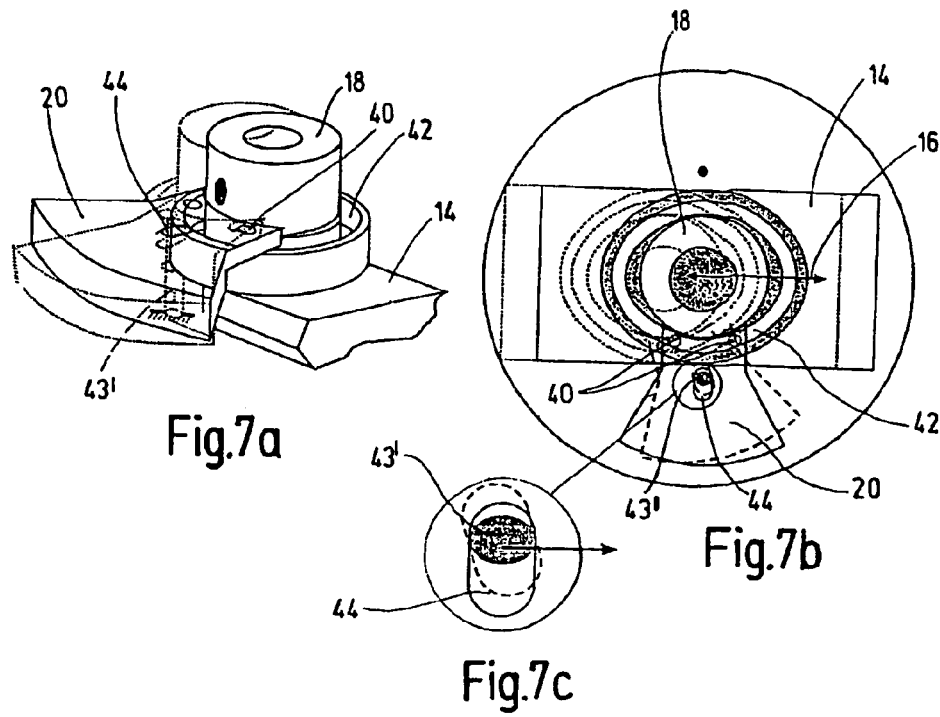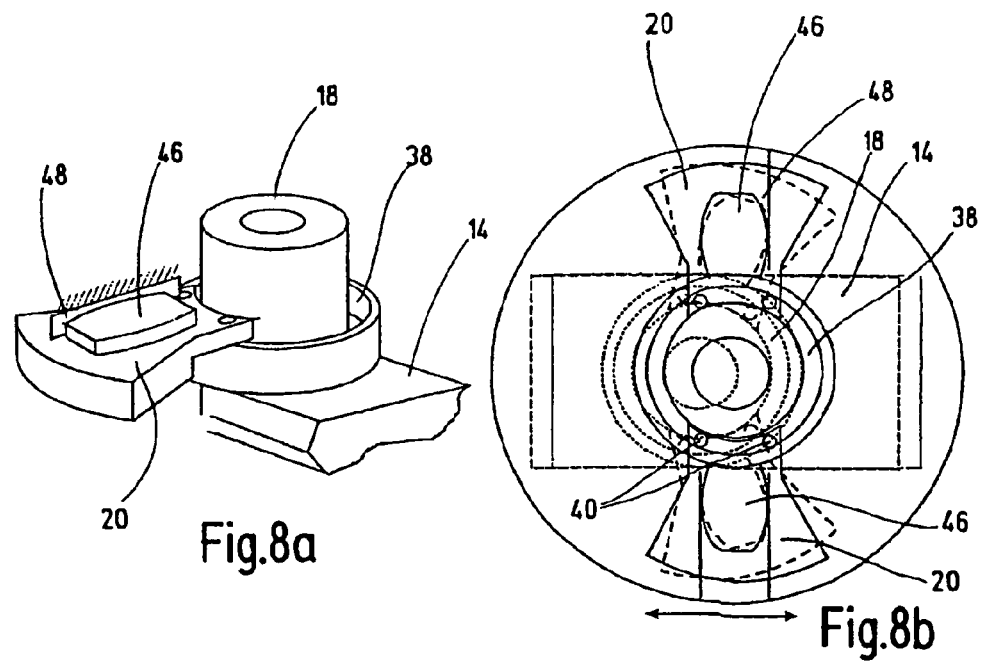

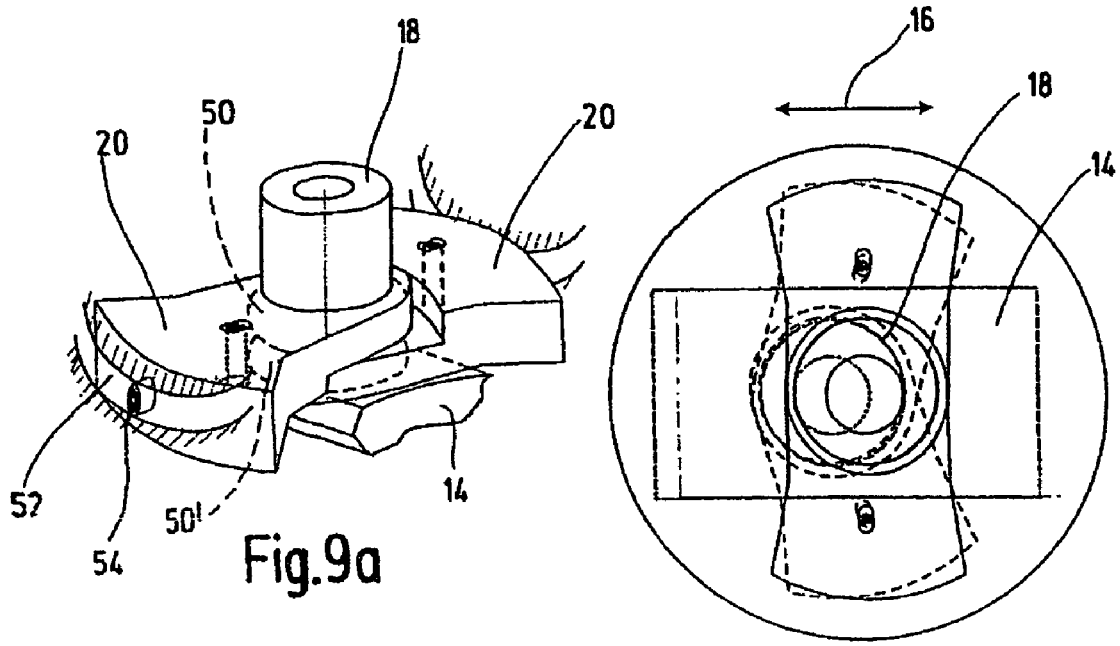
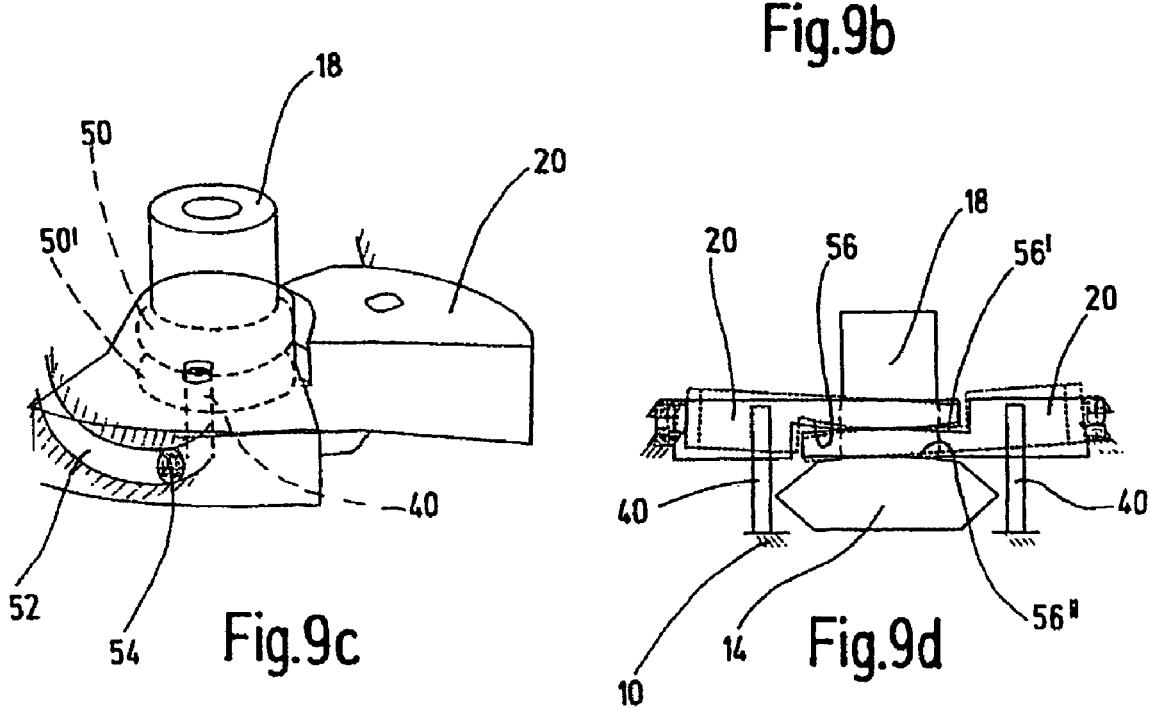

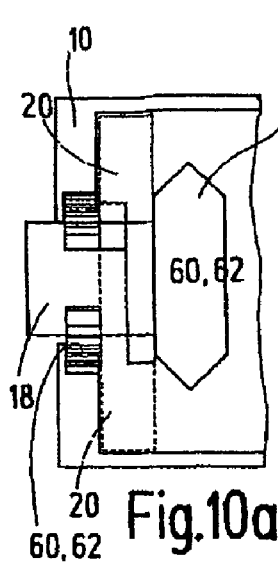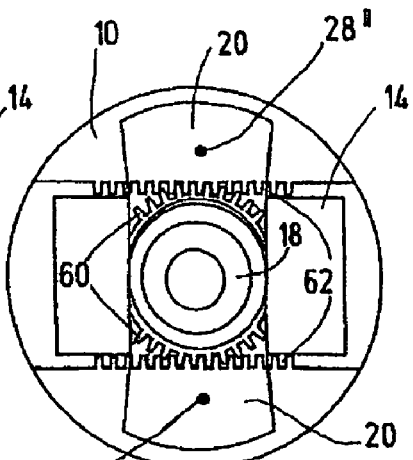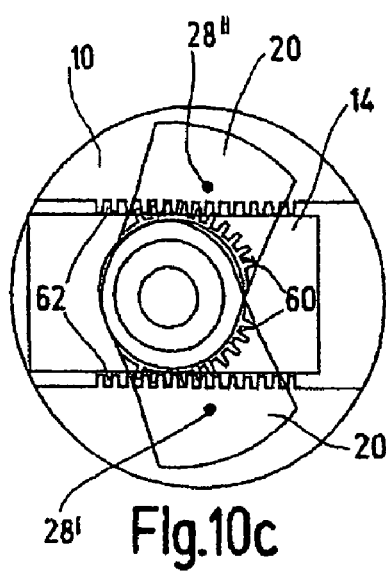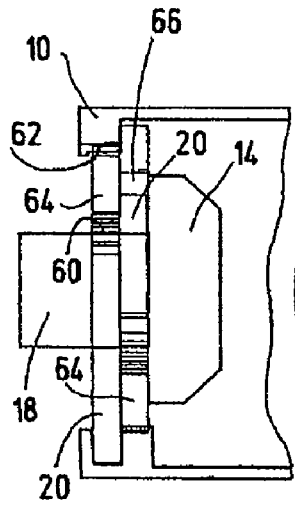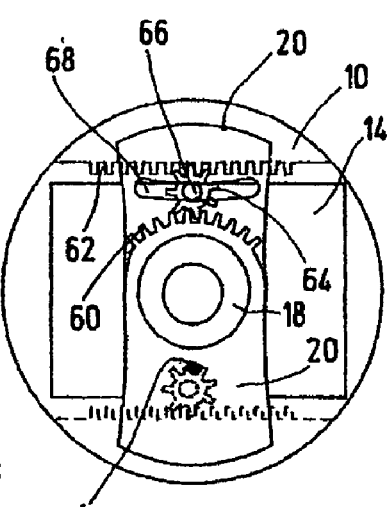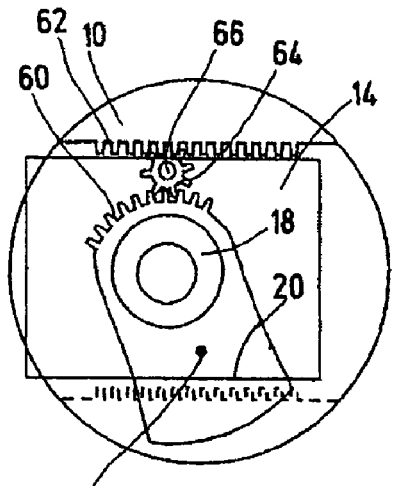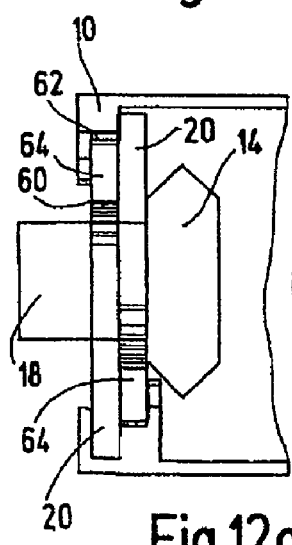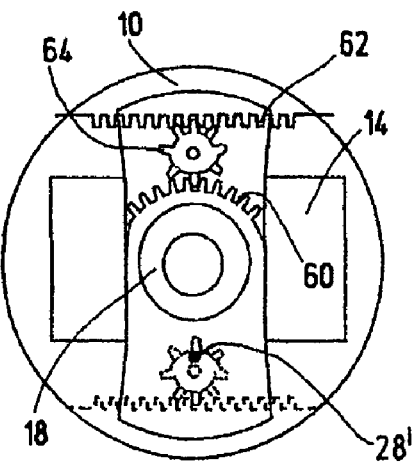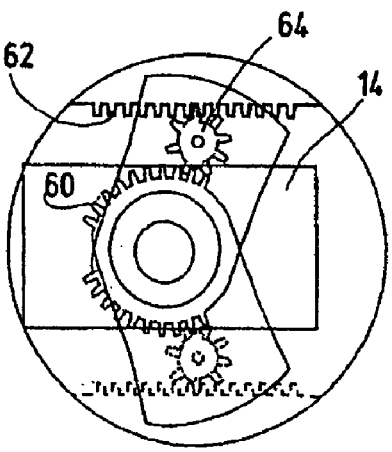

TOOL HEAD FOR MACHINE-TOOLS WITH UNBALANCE DAMPING

The invention relates to a tool head for use in machine tools, having a basic body rotatable about a rotation axis, having a slide carrying a cutting tool and adjustable relative to the basic body along a displacement axis oriented radially with respect to the rotation axis, and having at least one balancing body for damping unbalance caused by the slide and the cutting tool.

All systems for balancing objects rotating at high speed aim to place the center of gravity of the rotating bodies on the rotation axis. This becomes necessary, for example, when a tool head has moving parts and a variable unbalance vector occurs during the rotation. This is the case with tools which have a cutting edge which can be fed in radially during the rotation and thus permit turning operations on fixed workpieces. In rotating systems having a variable center of gravity, as is the case in facing heads for example, which have a tool slide as a cause of the variable unbalance, a balancing slide is normally used for the balancing, said balancing slide being moved in the opposite direction to the tool slide. To date, no system is known which prevents an accumulation of the centrifugal forces of the tool slide and of the balancing slide on the drive line. The balancing slide and the tool slide accordingly cause centrifugal forces which add up during the adjustment and have to be overcome by the drive line.

Based thereon, the object of the invention is to improve the tool head of the type mentioned at the beginning to the effect that, in addition to unbalance damping, a reduction in the actuating forces for the slide adjustment is also achieved.

The features according to the present invention are proposed in order to achieve this object.

The solution according to the invention is based in particular on the idea that at least two balancing bodies are provided which project laterally with their center of gravity beyond the displacement axis and are positively guided and/or are pivotable relative to the slide and relative to the basic body at points arranged at a distance from one another. The resulting positive coupling between the slide movement and the balancing body movement enables the drive mechanism to act, for example, only on the slide and enables the balancing body to be moved along in a positively guided manner for the unbalance damping. Since the slide is that part of the tool head which determines the accuracy, the drive line expediently acts on the slide. It is thus possible, in addition to the balancing, for a reduction in the actuating forces to be achieved at the same time independently of the speed. In the ideal case, during balancing, the actuating forces are balanced at the same time. To this end, the bearing forces and the guide forces must be matched exactly to one another by adaptation of the bearing and guide configurations assigned to one another. Since certain bearing and guide play has to be permitted for the sequences of movement, this ideal case cannot be quite achieved. The differential forces still remaining, such as reaction friction forces, which can also be dependent on speed, then still have to be overcome by the drive line.

A preferred configuration of the invention provides for the balancing bodies to be mounted so as to be pivotable about a pivot axis fixed relative to the slide and for them to be positively guided relative to the basic body at a distance from the pivot axis.

Especially advantageous is a symmetrical configuration in which two balancing bodies are provided which mounted so as to be pivotable in opposite directions about the same pivot axis intersecting the displacement axis of the slide at right angles. In this case, the balancing bodies are expediently designed and arranged essentially in mirror image with respect to the displacement axis.

A preferred configuration of the invention provides for the slide to have a receptacle for the cutting tool, the receptacle axis of which is preferably arranged parallel to the pivot axes, fixed relative to the slide, of the balancing bodies. The receptacle axis and the pivot axes, fixed relative to the slide, of the balancing bodies advantageously coincide. For specific applications, it is conceivable for the receptacle axis and the pivot axes, fixed relative to the slide, of the balancing bodies to also be oriented obliquely relative to one another.

To avoid torques which occur dynamically and could act on the tool head during the adjusting operation, it is proposed according to a preferred configuration of the invention that the centers of gravity of the slide, fitted with the tool, and of the balancing bodies be arranged essentially at the same axial height with respect to the rotation axis.

According to an advantageous structural configuration of the invention, the pivot bearing fixed relative to the slide is designed as a circular groove which surrounds the tool receptacle and in which the balancing bodies engage by means of at least two respective bearing elements designed as pins or rollers. This construction can in principle also be modified to the effect that the positive guides fixed relative to the slide are formed by an oval groove which surrounds the tool receptacle and whose longer oval axis is expediently oriented parallel to the displacement direction of the slide.

Furthermore, it is advantageous from a structural point of view if the balancing bodies carry a disk affected by mass and projecting in a segment-like manner beyond a central bearing part, the pivot axes, fixed relative to the slide, of the balancing bodies expediently being oriented parallel to the rotation axis.

According to a preferred configuration of the invention, the basic body and the balancing bodies have, as positive guide means, toothing parts which intermesh directly or indirectly. This means that the balancing bodies, during the adjusting operation, are positively guided along a complementary tooth part, fixed relative to the basic body, indirectly by means of a toothing part fixed relative to the balancing bodies, or directly via an intermediate gear. In this case, the toothing parts fixed relative to the balancing slide are advantageously designed as tooth rows curved concentrically to the pivot axis, fixed relative to the slide, of the balancing bodies, whereas the toothing parts fixed relative to the basic body may be designed as linear tooth rows oriented parallel to the displacement axis of the slide.

For the case where at least one of the toothing parts fixed relative to the balancing slide engages directly in an adjacent toothing part fixed relative to the basic body, the toothing part fixed relative to the balancing slide is expediently located with respect to the pivot axis on the side of the center of gravity of the associated balancing body. On the other hand, if the toothing parts fixed relative to the balancing slide mesh indirectly via an intermediate gear with an adjacent toothing part fixed relative to the basic body, the toothing parts fixed relative to the balancing slide are located with respect to the pivot axis on the side opposite the center of gravity of the associated balancing body. In the latter case, the intermediate gears may be mounted either in a rotary bearing fixed relative to the basic body or in a rotary bearing fixed relative to the slide. In the case of rotary bearings fixed relative to the slide, the intermediate gears mainly pass with a shaft of the rotary bearing through a preferably curved elongated through-opening of the other respective balancing body.

A further advantageous configuration of the invention provides for the balancing bodies, during the adjusting operation, to be positively guided along at least one guide curve or link, fixed relative to the basic body, by at least one supporting element fixed relative to the balancing bodies. Kinematically equivalent to this is a configuration in which the balancing bodies, during the pivoting operation, are positively guided along at least one guide curve or link, fixed relative to the balancing bodies, by at least one supporting element fixed relative to the basic body.

The supporting elements are advantageously designed as sliding shoes or rolling pins which project on the balancing body and are supported in a sliding or rolling manner against the guide curves or links arranged in the basic body or are hydrodynamically mounted. The guide curves or links are advantageously formed in a wall of the basic body in the form of elongated holes or grooves.

To avoid a geometrical redundancy in determination between supporting elements and guide curves or links, which could lead to undesirable wedging, it is proposed according to an advantageous configuration of the invention that a separate guide curve or link be assigned to each supporting element. For the case where each balancing body has two supporting elements, this means that two guide curves or links also have to be assigned to each balancing body.

The guide curves or links of the different balancing bodies are expediently arranged in mirror image to one another in the symmetrical case.

In principle, it is also possible according to the invention for the guide curves or links to be formed in the balancing bodies as essentially radially oriented elongated holes or grooves, in which a guide pin, arranged on the basic body and oriented in an axially parallel manner, a sliding block, link block or a corresponding guide roller engages.

In special cases, it is conceivable for a pivot point displacement to also be effected in the axial direction during the adjustment in order to avoid disturbing contours for example. In this case, it is proposed according to the invention that the balancing bodies be positively guided and/or that they be pivotable relative to the slide and/or the basic body in a wobble guide with a component motion axially parallel to the rotation axis.

Especially simple adaptation of the balancing system to different masses of the tools to be used is made possible by the balancing bodies being fitted with mass elements which can be interchanged in a modular manner and which can preferably be interchanged while retaining the centers of gravity on the side of the balancing bodies.

Alternatively, the same result can also be achieved using balancing bodies which can be interchanged in a modular manner in the tool head. According to a further alternative configuration of the invention, an interchangeable balancing module consisting of a basic body part and the balancing bodies is provided, which balancing module may in principle additionally comprise the tool slide.

The invention is explained in more detail below with reference to exemplary embodiments schematically shown in the drawing, in which:

FIG. 1 shows a diagrammatic illustration of a tool head with balancing according to a first embodiment;

FIGS. 2a and b show the tool head according to FIG. 1 in a diagrammatic illustration and in a plan view with one balancing body removed;

FIG. 3 shows coordinate systems of the tool head according to FIGS. 1 and 2;

Figure 1:
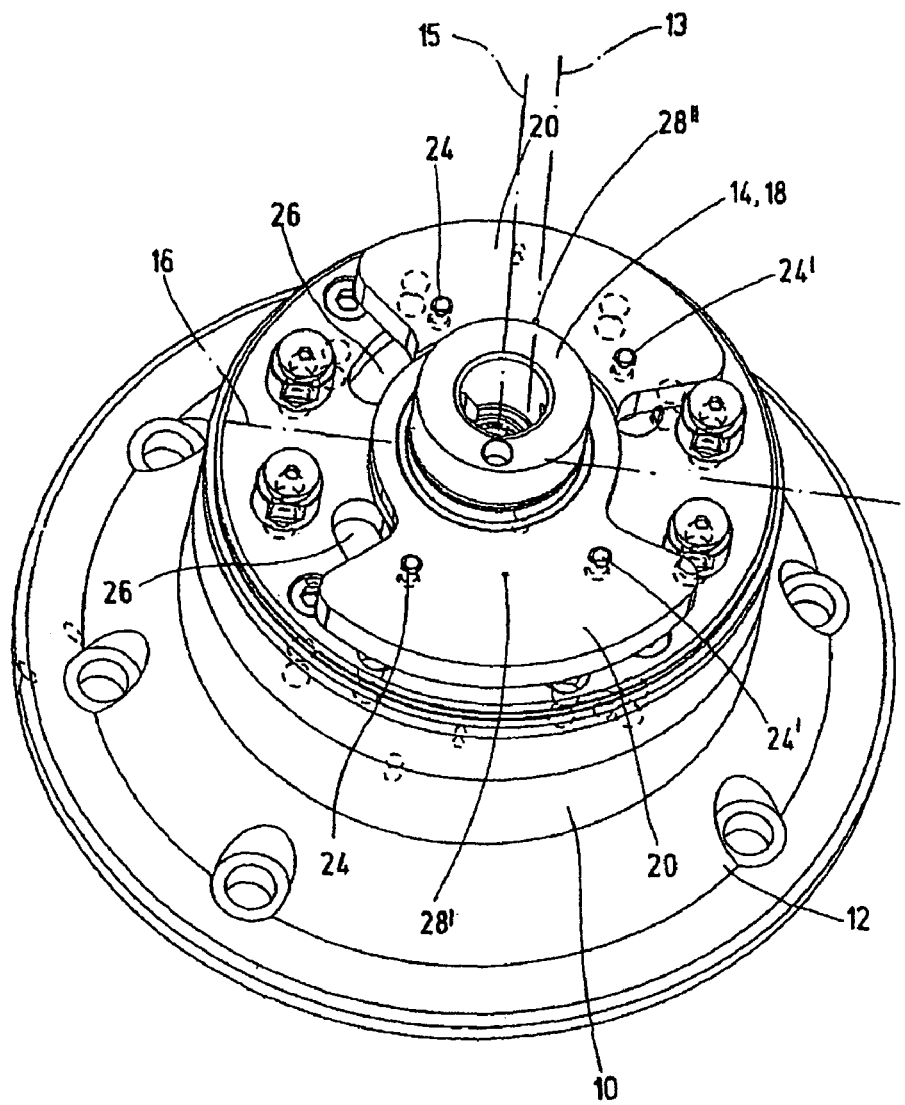
Figure 5A:
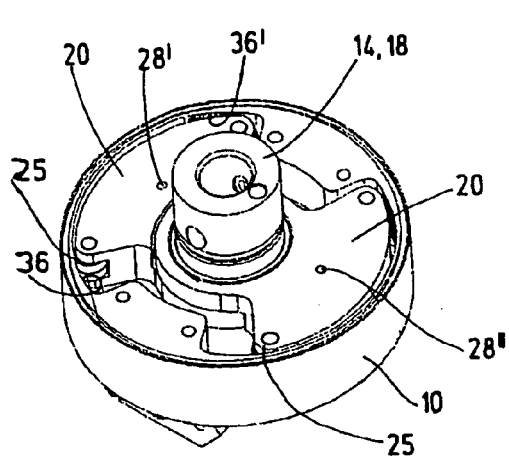
Figure 5B:
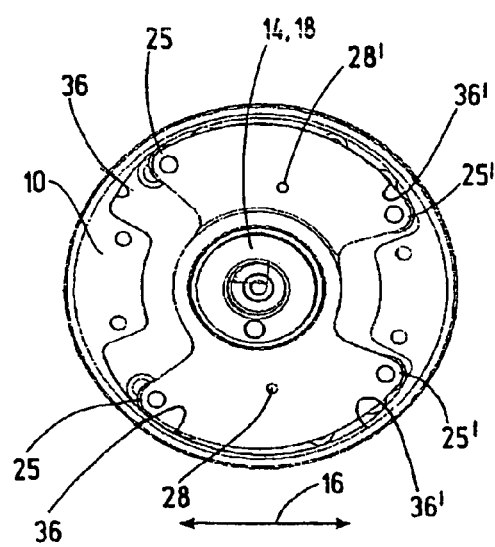
Figure 6A:
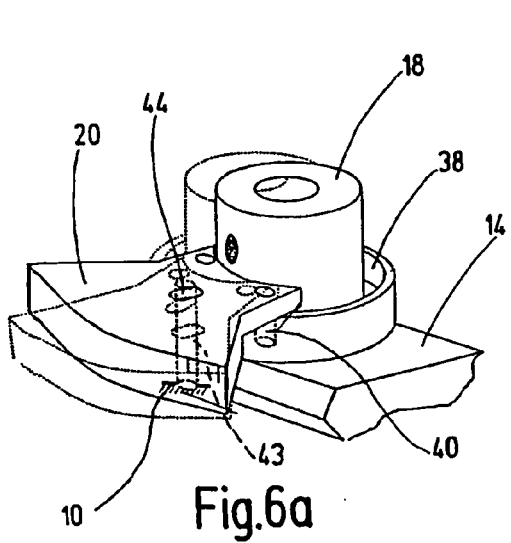
Figure 6B:
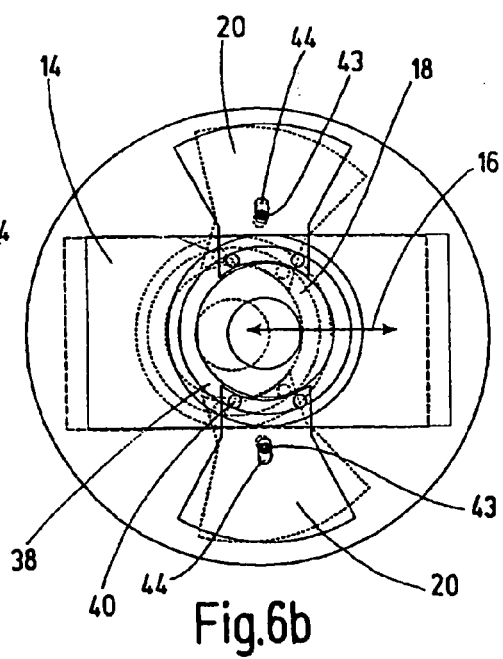

FIGS. 5a and b show an exemplary embodiment, modified compared with FIGS. 1 and 2, of a tool head with balancing bodies in a diagrammatic illustration and in plan view;

FIGS. 6a and b show a further exemplary embodiment of a tool head with balancing bodies in a truncated diagrammatic illustration and in plan view;

FIGS. 7a, b and c shows a further modified exemplary embodiment of a tool head with balancing bodies in a truncated diagrammatic illustration, in plan view and in a detail enlargement;

FIGS. 8a and b show a further modified exemplary embodiment of a tool head in a truncated diagrammatic illustration and in plan view;

FIGS. 9a to d show a further exemplary embodiment of a tool head with balancing bodies, with two diagrammatic illustrations in different adjusting states, a plan view and a side view;

FIGS. 10a to c show a side view and two plan views of a tool head with slide and pivotable balancing bodies and a toothing guide meshing directly;

FIGS. 11a to c show illustrations corresponding to FIG. 10 for an exemplary embodiment with toothing guides meshing indirectly and intermediate gear mounted in the slide;

FIGS. 12a to c show an illustration corresponding to FIG. 11 with intermediate gears mounted in the basic body.

The tool heads shown in the drawing are intended for use in machine tools. They have a basic body 10, which in the exemplary embodiment shown in FIG. 1 is rigidly connected via a flange 12 to the end face of a machine spindle (not shown) and is rotatable with the latter about a rotation axis 13. Mounted on the basic body is a tool slide 14 which is adjustable relative to the basic body 10 along a displacement axis 16 radially oriented with respect to the rotation axis 13 and has a receptacle 18 for a cutting tool (not shown). Furthermore, two balancing bodies 20 are provided, which are intended for damping the unbalance caused by the slide 14 and the cutting tool. The two balancing bodies project laterally with their center of gravity 28', 28" beyond the displacement axis 16 and are pivotable and/or positively driven relative to the slide 14 and to the basic body 10. In the exemplary embodiments shown in FIGS. 1, 2a, b 5a, b and 6a, b the balancing bodies 20 are pivotably mounted about a pivot axis 15 fixed relative to the slide and in alignment with the axis of the tool receptacle 18 and are positively guided relative to the basic body at a distance from the pivot axis 15.

In the exemplary embodiment shown in FIGS. 1, 2a and b, the balancing bodies 20 are each provided with two supporting elements 24 which are designed as rolling pins and with which said balancing bodies 20 are positively guided along a respective guide link 26, 26' which is fixed relative to the basic body and is designed as a curved elongated hole.

To mathematically determine the optimum guide links 26, 26', the coordinate systems of the tool head which are shown in FIG. 3 are to be taken into account:

| | |
|---|---|
| x/y | coordinate system of the basic body |
| $x_S/y_S$ | coordinate system of the slide |
| $x_{AS}/y_{AS}$ | coordinate system of the balancing body |

The sequences of movement of the slide 14 and of the associated balancing bodies 20 are indicated in FIG. 3 by solid and broken lines. During the displacement process, the centers of gravity 28', 28" of the balancing bodies 20 travel on a curved path in the opposite direction to the slide 14. If the displacement direction 16 of the slide 14 is placed in the y axis of the basic body and the rotation axes 15 of the two balancing bodies 20 are placed at the origin of the coordinate system of the slide 14, the following relationships are obtained for the calculation of the geometric location of any desired balancing body point $x_{AS}$, $y_{AS}$ in the coordinate system of the basic body x, y:

$$\begin{pmatrix} x \\ y \end{pmatrix} = \begin{pmatrix} x_s \\ y_s \end{pmatrix} + \begin{pmatrix} 0 \\ \text{stroke} \end{pmatrix}$$

$$\begin{pmatrix} x_s \\ y_s \end{pmatrix} = \begin{pmatrix} \cos\varphi & -\sin\varphi \\ \sin\varphi & \cos\varphi \end{pmatrix} \cdot \begin{pmatrix} x_{AS} \\ y_{AS} \end{pmatrix}$$

The combination of the two formulae leads to the following path curve:

$$\begin{pmatrix} x \\ y \end{pmatrix} = \begin{pmatrix} \cos\varphi & -\sin\varphi \\ \sin\varphi & \cos\varphi \end{pmatrix} \cdot \begin{pmatrix} x_{AS} \\ y_{AS} \end{pmatrix} + \begin{pmatrix} 0 \\ \text{stroke} \end{pmatrix}$$

In order to achieve balancing, the following relationship between the stroke of the slide and the rotary angle φ of the balancing body is obtained:

$$\varphi = \text{Arcsin}\left(\frac{\text{stroke} - y_{balance}}{x_{AS-TSWp}}\right)$$

where $y_{balance}$ represents the position of the center of gravity of the balancing body. Accordingly, the angle of rotation can be influenced by the selection of $y_{balance}$.

Figure 4:
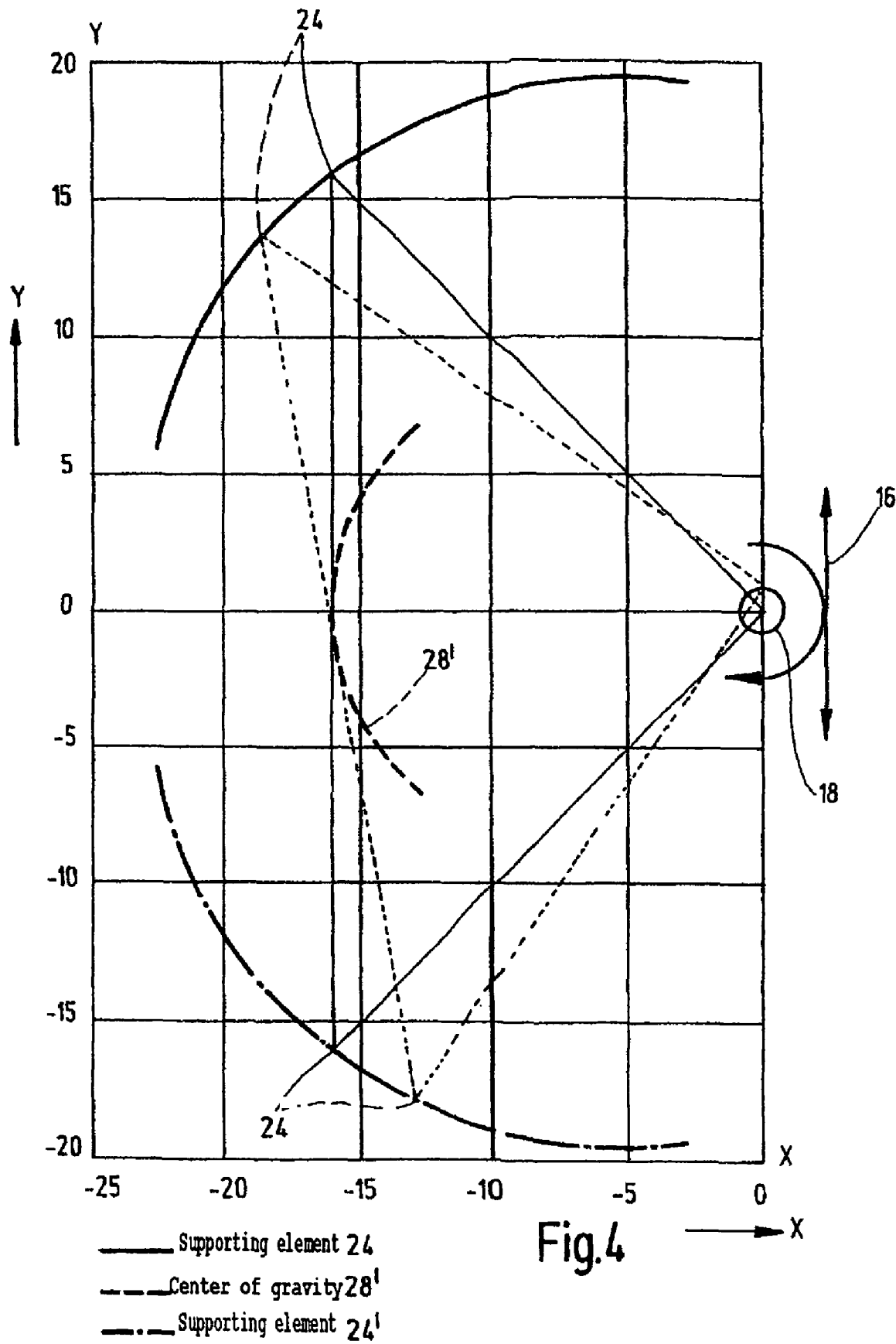
FIG. 4 shows the geometrical location of the guide pin of one of the balancing bodies and of the center of gravity of the balancing body in relation to the slide stroke in the basic body coordinate system.

The paths of the two supporting elements 24, 24' and of the center of gravity 28, 28' of one of the balancing bodies 20 are shown by way of example in FIG. 4. The path curves in the basic body coordinate system at the same time form the positive guides for the two supporting elements 24, 24' on the relevant balancing body 20. The unbalance damping is effected by the free parameters available being adapted to the actual requirements of the slide/balancing-body system. The following variables are suitable for this purpose:
a) the $x_{AS}/y_{AS}$ coordinates of the supporting elements
b) the $x_{AS}$ coordinates of the center of gravity of the balancing body
c) the masses of the balancing bodies
d) a proportionality factor.

If said parameters are suitably selected, balancing of the centrifugal forces between tool slide 14 and balancing bodies 20 is obtained within a predetermined stroke range.

The exemplary embodiment shown in FIGS. 5a and b differs from the exemplary embodiment according to FIGS. 1 and 2a and b in that, instead of the guide links 26, 26', guide curves 36, 36' are provided in the vicinity of a housing wall of the basic body 10, against which guide curves 36, 36' the supporting elements 24, 24' in the form of rollers projecting radially beyond the balancing bodies 20 bear.

In the exemplary embodiment according to FIGS. 6a and b, the balancing bodies 20 are mounted by means of bearing elements 40 in the form of sliding or rolling pins in a circular groove 38 surrounding the tool receptacle 18. In addition, a respective guide link 44 pointing radially outward is located in the balancing bodies 20, in which guide link 44 a supporting element 43 in the form of a pin and fixed relative to the basic body engages. A defined displacement and pivoting movement which leads to balancing can also be achieved with these measures.

The same correspondingly applies to the exemplary embodiment shown in FIGS. 7a to c, in which the tool receptacle 18 is enclosed by an oval groove 42, in which the balancing bodies 20 again engage by means of pin-shaped supporting elements 40. Here, too, a guide curve in the form of an elongated hole 44 is arranged in the balancing bodies 20, and a supporting element 43' fixed relative to the basic body in the form of an oval pin engages in said guide curve.

The exemplary embodiment according to FIGS. 8a and b corresponds essentially to the embodiment according to FIGS. 7a to c, with the difference that, instead of an elongated hole, a guide lug 46 is arranged on the balancing bodies 20, and this guide lug 46 bears against a guide curve 48 fixed relative to the basic body and rolls relative to said guide curve 48 during a stroke movement.

The embodiment according to FIGS. 9a to d corresponds in principle to the exemplary embodiment according to FIGS. 6a and b, with the one difference that the balancing bodies 20, in addition to a pivoting movement about the tool receptacle 18 fixed relative to the slide, are also axially deflected. In order to permit this, the rotary bearings 50, 50' of the balancing bodies 20 are designed as ball bearings, whereas the guide links 52 which are fixed relative to the basic body, and in which supporting elements 54 fixed relative to the balancing bodies are guided, cause a wobbling movement in the axial direction. In order to permit the wobbling sequence of movement, the balancing bodies 20 and the slide 14 have crowned bearing surfaces 56', 56", 56'" bearing against one another. With this measure, it is possible to evade any disturbing contours during the displacement movement of the slide 14 with the balancing bodies 20.

In the embodiments according to FIGS. 10a to c, 11a to c and 12a to c, the positive guide means are formed between the balancing bodies 20 and the basic body 10 as toothing parts 60, 62 intermeshing directly or indirectly. In this case, during the adjusting operation, the balancing bodies 20 pivotable about the pivot axis 15 fixed relative to the slide are positively guided along a linear tooth row 62, fixed relative to the basic body, directly by a tooth row 60 fixed relative to the balancing slide and curved coaxially to the pivot axis 15, or indirectly via an intermediate gear 64. The tooth rows 62 forming the toothing parts fixed relative to the basic body are oriented parallel to the displacement axis 16. In the exemplary embodiment shown in FIGS. 10a to c, the tooth rows 60, 62 of the two toothing parts intermesh directly. Accordingly, the tooth rows fixed relative to the balancing slide are in this case arranged with respect to the pivot axis 15 on the same side as the center of gravity 28', 28" of the associated balancing body. In deviation therefrom, in the exemplary embodiments shown in FIGS. 11a to c and 12a to c and having the additional intermediate gear 64, the toothing part 60 fixed relative to the balancing slide is in each case arranged with respect to the pivot axis 15 on the side opposite the center of gravity 28', 28". These two embodiments differ in particular in the fact that the intermediate gears 64 are mounted in the slide 14 in the case of FIGS. 11a to c and in the basic body 10 in the case of FIGS. 12a to c. Here, it may be necessary in particular with the mounting fixed relative to the slide for one of the intermediate gears 64 to pass with its rotation axis 66 through a preferably curved, elongated through-opening 68 of the other balancing body 20. The toothing parts 60, 62, possibly with intermediate gear 64, are matched to one another in such a way that balancing of the centrifugal forces between tool slide 14 and balancing body 20 is obtained within a predetermined stroke range.

In summary, the following is to be emphasized: the invention relates to a tool head for use in machine tools. The tool head has a basic body 10 rotatable about a rotation axis 13, a slide 14 carrying a cutting tool and adjustable by means of a drive mechanism relative to the basic body 10 along a displacement axis 16 oriented radially with respect to the rotation axis 13, and at least one balancing body 20 for damping unbalance caused by the slide 14. In order to achieve a reduction in the actuating forces in addition to the unbalance damping, it is proposed according to the invention that at least two balancing bodies 20 be provided which project laterally with their center of gravity 28', 28" beyond the displacement axis 16 and which are positively guided and/or are pivotable relative to the slide and relative to the basic body at points arranged at a distance from one another.

The invention claimed is:

1. A tool head for use in machine tools, having a basic body (10) rotatable about a rotation axis (13), having a slide (14) carrying a cutting tool, the slide (14) and cutting tool being adjustable by means of a drive mechanism relative to the basic body (10) along a displacement axis (16) oriented radially with respect to the rotation axis, and having at least two balancing bodies (20) for damping unbalance caused by the radial adjustment of the slide (14) and the cutting tool, at least two of the balancing bodies (20) being provided which project laterally with their center of gravity (28', 28") beyond the displacement axis (16) and are pivotable relative to the slide (14) and relative to the basic body (10), characterized in that the balancing bodies (20) are mounted so as to be pivotable about a pivot axis fixed relative to the slide.

2. The tool head as claimed in claim 1, characterized in that two of the balancing bodies (20) are provided which are mounted so as to be pivotable in opposite directions about the same pivot axis (15), which pivot axis intersects the displacement axis (16) of the slide at a right angle.

3. The tool head as claimed in claim 2, characterized in that the balancing bodies (20) are designed and arranged essentially in mirror image with respect to the displacement axis (16).

4. The tool head as claimed in claim 1, characterized in that the slide (14) has a receptacle (18) for the cutting tool.

5. The tool head as claimed in claim 4, characterized in that the receptacle axis and the pivot axes, fixed relative to the slide, of the balancing bodies coincide.

6. The tool head as claimed in claim 1, characterized in that the balancing bodies (20) are positively guided relative to the basic body at a distance from the pivot axis.

7. The tool head as claimed in claim 1, characterized in that the centers of gravity (28', 28") of the slide (14), fitted with the tool, and of the balancing bodies (20) are arranged essentially at the same axial height with respect to the rotation axis (13).

8. The tool head as claimed in claim 1, characterized in that the balancing bodies (20), during the radial adjusting operation, are positively guided along at least one guide curve (26, 26') or link, fixed relative to the basic body, by at least one supporting element (24, 24') fixed relative to the balancing bodies.

9. The tool head as claimed in claim 8, characterized in that the at least one supporting element (24, 24') is designed as a sliding shoe or rolling pin which is provided to the respective balancing body (20) and is supported in a sliding or rolling manner against the respective at least one guide curve (26, 26') or the respective at least one link arranged in the basic body (10).

10. The tool head as claimed in claim 8, characterized in that the at least one guide curve (26, 26') or link is formed fixed relative to the basic body in the form of elongated holes or grooves.

11. The tool head as claimed in claim 8, characterized in that a separate one of the at least one guide curve (26, 26') or link is assigned to each supporting element (24, 24').

12. The tool head as claimed in claim 11, characterized in that two of the guide curves (26, 26') or links for different supporting elements (24, 24') are assigned to each balancing body (20).

13. The tool head as claimed in claim 8, characterized in that the at least one guide curve (26, 26') or link of the different balancing bodies (20) are arranged in mirror image to one another.

14. The tool head as claimed in claim 1, characterized in that the balancing bodies (20), during the radial adjusting operation, are positively guided along at least one guide curve or link, fixed relative to the balancing bodies, by at least one supporting element (40) fixed relative to the basic body.

15. The tool head as claimed in claim 1, characterized in that the balancing bodies (20), during the radial adjusting operation, are each positively guided along at least one guide curve or link, each of the at least one guide curve or link is formed in the respective balancing body (20) as an essentially radially oriented elongated hole (44) or groove, in which a supporting element (43) arranged on the basic body (10) engages.

16. The tool head as claimed in claim 1, characterized in that there is an oval groove (42) surrounding a tool receptacle (18) for the cutting tool.

17. The tool head as claimed in claim 16, characterized in that the longer oval axis is oriented parallel to the displacement axis (16) of the slide (10).

18. The tool head as claimed in claim 1, characterized in that the balancing bodies (20) are positively guided in a wobble guide (52) with a component of motion axially parallel to the rotation axis.

19. The tool head as claimed in claim 1, characterized in that the basic body includes a flange for rigid connection to a machine spindle.

20. The tool head as claimed in claim 1, characterized in that the centers of gravity (28', 28") of the balancing bodies (20) travel on a curved path during the radial adjustment of the slide (14).

21. The tool head as claimed in claim 1, characterized in that the balancing bodies (20) each encircle a receptacle (18) for the cutting tool.

22. A tool head for use in machine tools, having a basic body (10) rotatable about a rotation axis (13), having a slide (14) carrying a cutting tool, the slide (14) and cutting tool being adjustable by means of a drive mechanism relative to the basic body (10) along a displacement axis (16) oriented radially with respect to the rotation axis, and having at least two balancing bodies (20) for damping unbalance caused by the radial adjustment of the slide (14) and the cutting tool, at least two of the balancing bodies (20) being provided which project laterally with their center of gravity (28', 28") beyond the displacement axis (16) and are pivotable relative to the slide (14) and relative to the basic body (10), characterized in that the centers of gravity (28', 28") of the slide (10), fitted with the tool, and of the balancing bodies (20) are arranged essentially at the same axial height with respect to the rotation axis (13), and wherein the balancing bodies are mounted via a pivot bearing fixed relative to the slide such that the balancing bodies (20) are pivotable about a pivot axis (15) fixed relative to the slide (14).

23. The tool head as claimed in claim 22, characterized in that the pivot bearing fixed relative to the slide is designed as a circular groove (38) which surrounds a tool receptacle (18) for the cutting tool, and in which circular groove (38) the balancing bodies (20) engage by means of at least one respective bearing element (40) designed as a pin or roller.

24. The tool head as claimed in claim 22, characterized in that the balancing bodies (20) each include a central bearing part and a a disk segment part projecting therefrom.

25. The tool head as claimed in claim 22, characterized in that the pivot axis (15), fixed relative to the slide, of the balancing bodies (20) is oriented parallel to the rotation axis (13).

26. The tool head as claimed in claim 22, characterized in that the basic body (10) and the balancing bodies (20) have, as positive guide means, toothing parts (60, 62) which intermesh directly or indirectly.

27. The tool head as claimed in claim 22, characterized in that the balancing bodies (20) each encircle a receptacle (18) for the cutting tool.

28. A tool head for use in machine tools, having a basic body (10) rotatable about a rotation axis (13), having a slide (14) carrying a cutting tool, the slide (14) and cutting tool being adjustable by means of a drive mechanism relative to the basic body (10) along a displacement axis (16) oriented radially with respect to the rotation axis, and having at least two balancing bodies (20) for damping unbalance caused by the radial adjustment of the slide (14) and the cutting tool, at least two of the balancing bodies (20) being provided which project laterally with their center of gravity (28', 28") beyond the displacement axis (16) and are pivotable relative to the slide (14) and relative to the basic body (10), characterized in that the balancing bodies (20) are mounted so as to be pivotable about a pivot axis (15) fixed relative to the slide (14), and in that the basic body (10) and the balancing bodies (20) have, as positive guide means, toothing parts (60, 62) which intermesh directly or indirectly.

29. The tool head as claimed in claim 28, characterized in that the balancing bodies (20), during the adjusting operation, are positively guided along a complementary tooth part (62), fixed relative to the basic body, directly by means of a toothing part (60) fixed relative to the balancing bodies, or indirectly via an intermediate gear (64).

30. The tool head as claimed in claim 28, characterized in that the toothing parts include toothing parts (60) that are fixed relative to the balancing bodies and that are designed as tooth rows curved concentrically to the pivot axis (15), which pivot axis is fixed relative to the slide, of the balancing bodies (20), and also include toothing parts (62) that are fixed relative to the basic body and that are designed as linear tooth rows oriented parallel to the displacement axis (16) of the slide (14).

31. The tool head as claimed in claim 28, characterized in that the toothing parts include toothing parts (60) that are fixed relative to the balancing bodies and that engage directly in an adjacent toothing part (62) fixed relative to the basic body, and the toothing parts that are fixed relative to the balancing bodies (20) are arranged with respect to the pivot axis (15) on the side of the associated balancing body opposite the center of gravity (28', 28") of the associated balancing body (20).

32. The tool head as claimed in claim 28, characterized in that the toothing parts include toothing parts (60) that are fixed relative to the associated balancing bodies and that each mesh indirectly via an intermediate gear (64) with an adjacent toothing part (62) fixed relative to the basic body and are arranged with respect to the pivot axis (15) on the side of the associated balancing body that is opposite the center of gravity (28', 28") of the associated balancing body (20).

33. The tool head as claimed in claim 32, characterized in that at least one of the intermediate gears (64) is mounted via a rotary bearing fixed relative to the basic body.

34. The tool head as claimed in claim 33, characterized in that at least one of the intermediate gears (64) passes with a shaft (66) of the rotary bearing through an elongated curved through-opening (68).

35. The tool head as claimed in claim 32, characterized in that at least one of the intermediate gears (64) is mounted via a rotary bearing fixed relative to the slide.

36. The tool head as claimed in claim 28, characterized in that the balancing bodies (20) each encircle a receptacle (18) for the cutting tool.

37. A tool head for use in machine tools, having a basic body (10) rotatable about a rotation axis (13), having a slide (14) carrying a cutting tool, the slide (14) and cutting tool being adjustable by means of a drive mechanism relative to the basic body (10) along a displacement axis (16) oriented radially with respect to the rotation axis, and having at least two balancing bodies (20) for damping unbalance caused by the radial adjustment of the slide (14) and the cutting tool, at least of the two balancing bodies (20) being provided which project laterally with their center of gravity (28', 28") beyond the displacement axis (16) and are pivotable relative to the slide (14) and relative to the basic body (10), characterized in that the balancing bodies (20) are mounted so as to be pivotable about a pivot axis (15) fixed relative to the slide (14), and in that the balancing bodies (20), during the radial adjusting operation, are positively guided along at least one guide curve (36, 36') provided in the vicinity of a housing wall of the basic body, or along at least one guide link (26, 26') in the form of an elongated hole, said at least one guide curve or said at least one guide link being fixed relative to the basic body, the balancing bodies being positively guided by at least one supporting element (24, 24') fixed relative to the balancing bodies.

38. A tool head for use in machine tools, having a basic body (10) rotatable about a rotation axis (13), having a slide (14) carrying a cutting tool, the slide (14) and cutting tool being adjustable by means of a drive mechanism relative to the basic body (10) along a displacement axis (16) oriented radially with respect to the rotation axis, and having at least two balancing bodies (20) for damping unbalance caused by the radial adjustment of the slide (14) and the cutting tool, at least two of the balancing bodies (20) being provided which project laterally with their center of gravity (28', 28") beyond the displacement axis (16) and are pivotable relative to the slide (14) and relative to the basic body (10), characterized in that the balancing bodies (20) are mounted so as to be pivotable about a pivot axis (15) fixed relative to the slide (14) and the balancing bodies (20), during the radial adjusting operation, are positively guided along at least one guide curve or link in the form of an elongated hole, fixed relative to the balancing bodies, by at least one supporting element (40) fixed relative to the basic body.

39. A tool head for use in machine tools, having a basic body (10) rotatable about a rotation axis (13), having a slide (14) carrying a cutting tool, the slide(14) and cutting tool being adjustable by means of a drive mechanism relative to the basic body (10) along a displacement axis (16) oriented radially with respect to the rotation axis, and having at least two balancing bodies (20) for damping unbalance caused by the radial adjustment of the slide (14) and the cutting tool, at least two of the balancing bodies (20) being provided which project laterally with their center of gravity (28', 28") beyond the displacement axis (16) and are pivotable relative to the slide (14) and relative to the basic body (10), characterized in that the balancing bodies (20) are mounted so as to be pivotable about a pivot axis (15) fixed relative to the slide (14) and are mounted so as to also be pivotable in a wobble guide (52) with a component of motion axially parallel to the rotation axis.

* * * * *